Nov. 5, 1935.        B. BOGOSLOWSKY        2,019,886
                      THERMOHYGROMETER
                     Filed March 31, 1933         3 Sheets-Sheet 1
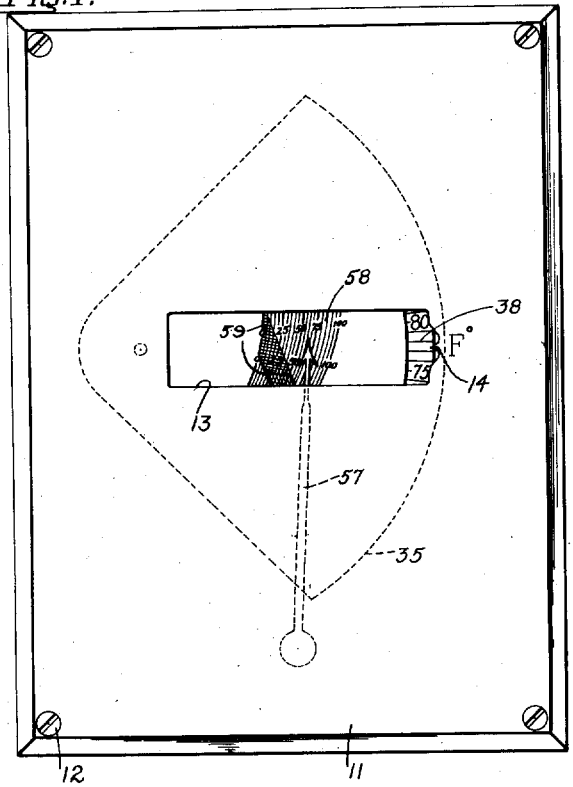
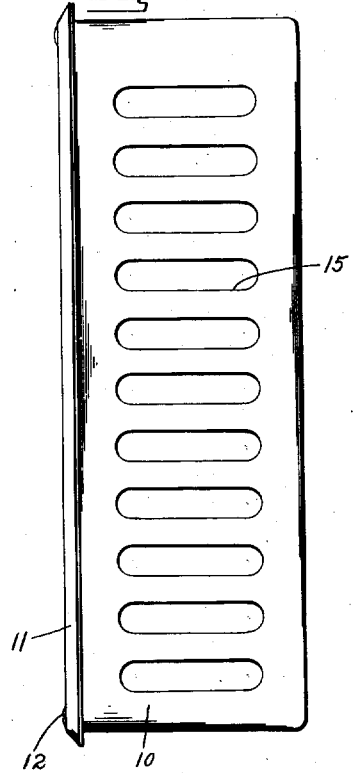
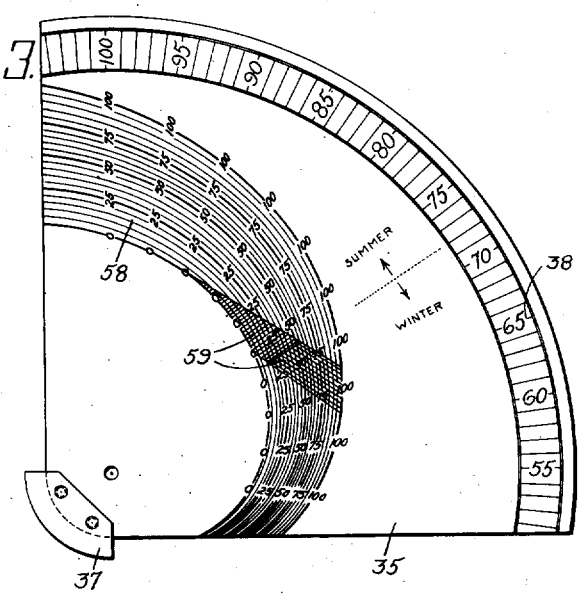
INVENTOR.
BORIS BOGOSLOWSKY
BY
ATTORNEY.

Nov. 5, 1935.  B. BOGOSLOWSKY  2,019,886

THERMOHYGROMETER

Filed March 31, 1933  3 Sheets-Sheet 2

INVENTOR.
BORIS BOGOSLOWSKY
BY
ATTORNEY.

Nov. 5, 1935.     B. BOGOSLOWSKY     2,019,886
THERMOHYGROMETER
Filed March 31, 1933     3 Sheets-Sheet 3
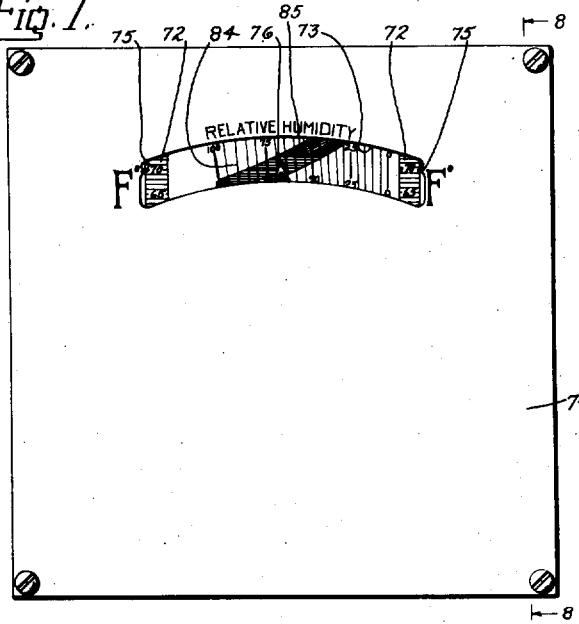
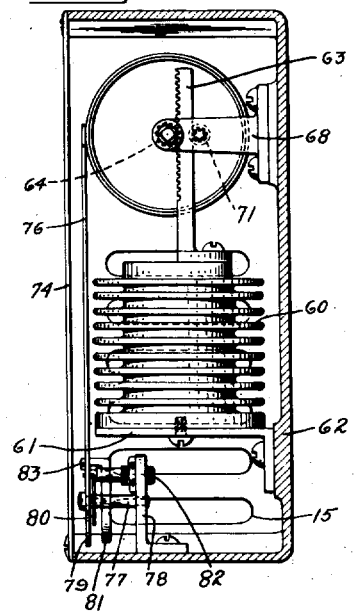
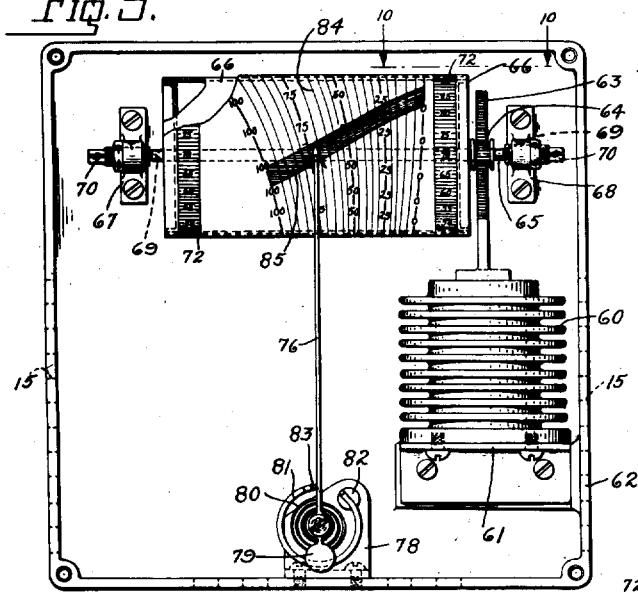
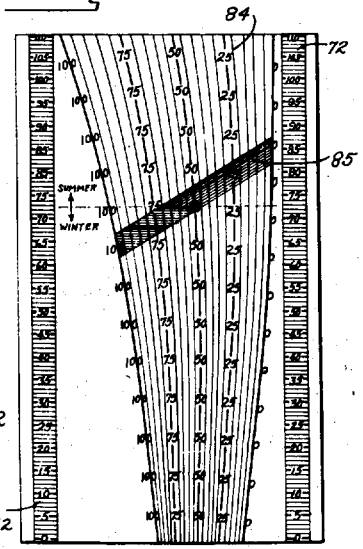
INVENTOR.
BORIS BOGOSLOWSKY.
BY
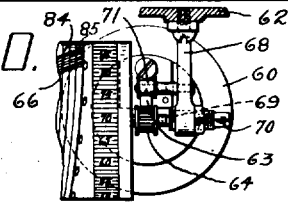
ATTORNEY.

Patented Nov. 5, 1935

2,019,886

UNITED STATES PATENT OFFICE 2,019,886

THERMOHYGROMETER

Boris Bogoslowsky, Bridgeport, Conn.

Application March 31, 1933, Serial No. 663,734

3 Claims. (Cl. 73—24)

The present invention relates to a thermohygrometer, and has for an object to provide an indicating instrument of this character which will show accurately as a composite reading both the temperature and the relative humidity of the air, and which at the same time will show what humidity at a given temperature is most desirable for comfort and health, enabling correction of the temperature and humidity conditions until the instrument indicates that the proper combination of temperature and humidity are reached.

It is well known that a comfortable and healthy atmospheric environment cannot be maintained by temperature alone, or by humidity alone, but that there must be a definite relation between them, and also that this relation varies considerably with the seasons. For instance in the summer time when both the temperature and humidity are high the body suffers considerable discomfort because evaporation from the skin is prevented by the high vapor pressure of the moist air, the skin of the body being prevented from "breathing" properly. If this temperature should be left high, and the humidity reduced considerably, the air will then be relatively dry and will more rapidly absorb moisture from the skin, with the result that the body experiences a cooling effect although the temperature of the air remains the same.

On the other hand, during cold winter days one very often experiences discomfort from chilliness in a room where the temperature is maintained as high as 75° F., because usually in cold weather the air in a house is very dry, and this dry air, absorbing the moisture from the skin of the body, chills it. If instead of raising the temperature, the humidity of the air in the room is considerably increased, then the vapor pressure of this moistened air will reduce the rate of evaporation from the skin, creating the effect of warmth even though the temperature remains the same.

From these two examples it can be readily seen that a sense of comfort depends to a great extent upon the rate of moisture evaporation from the skin at different temperatures. There is no fixed degree of humidity that is comfortable at all different temperatures and there is no one temperature that is comfortable at different humidities.

Heretofore there has been no instrument available for convenient home use which shows clearly and accurately, without any calculation or manipulation on the part of the observer, what the exact temperature and humidity conditions of the air are, and what they should be to produce the proper health and comfort effects under different seasonal conditions. Most instruments heretofore known show temperature and humidity separately, and the humidity scale usually has the indications "Low", up to 25%, "Normal", between 25% and 75%, and "High", between 75% and 100%. However, such indications are entirely inadequate to indicate the proper health and comfort conditions, for in the summertime, for instance, a person would feel more comfortable at 20% humidity and 90° F. temperature, than at the "Normal" humidity of 25% to 75%.

It is therefore proposed in the present invention to provide an instrument which will indicate accurately the proper temperature and humidity combinations under all conditions in a manner that will be entirely clear and readily understood by the average householder, and without the necessity for any calculation or manipulation.

Another object is to provide a humidity indicator which will give accurate humidity indication at different temperatures, as distinguished from instruments heretofore in use which show humidity accurately only for a certain temperature. Whatever element is used for humidity indication, whether it be human hair, a piece of cellulose, or any other element effected by moisture, they obtain indications of humidity by the effect of moisture on this element, but as the absolute moisture-content in the air varies with temperature, the indications of these instruments are affected by temperature, so that it is only possible for them to be accurate at the certain temperature for which the scale of humidity is prepared in the particular instrument.

It is proposed in the present invention to provide a humidity scale which is variable with the temperature, so that at any temperature within the range of the instrument the relative humidity will be accurately shown. It is also proposed to provide an indicator which will indicate in combination with the temperature and relative humidity indications what the best humidity for health and comfort should be at the indicated temperature, at the particular season of the year. The user will thus be enabled to tell at a glance whether the existing conditions are correct, and if not correct to determine what is necessary to be done to obtain the correct conditions.

With the above and other objects in view embodiments of the invention are shown in the accompanying drawings and these embodiments will be hereinafter more fully described with reference thereto, and the invention will be finally pointed out in the claims.

In the drawings:

Fig. 1 is a front elevation of a thermohygrometer according to one exemplary illustrated embodiment of the invention.

Fig. 2 is a side elevation thereof.

Fig. 3 is a front elevation of the temperature and humidity indicating scale element employed.

Fig. 7 is a front elevation of a modified form of the invention.

Fig. 8 is a vertical sectional view, taken along the line 8—8 of Fig. 7.

Fig. 9 is a front elevation, with the cover plate removed.

Fig. 10 is a fragmentary horizontal sectional view, taken along the line 10—10 of Fig. 9.

Fig. 11 is a flattened plan view of the scale element.

Similar reference characters indicate corresponding parts throughout the several figures of the drawings.

Figure 4:
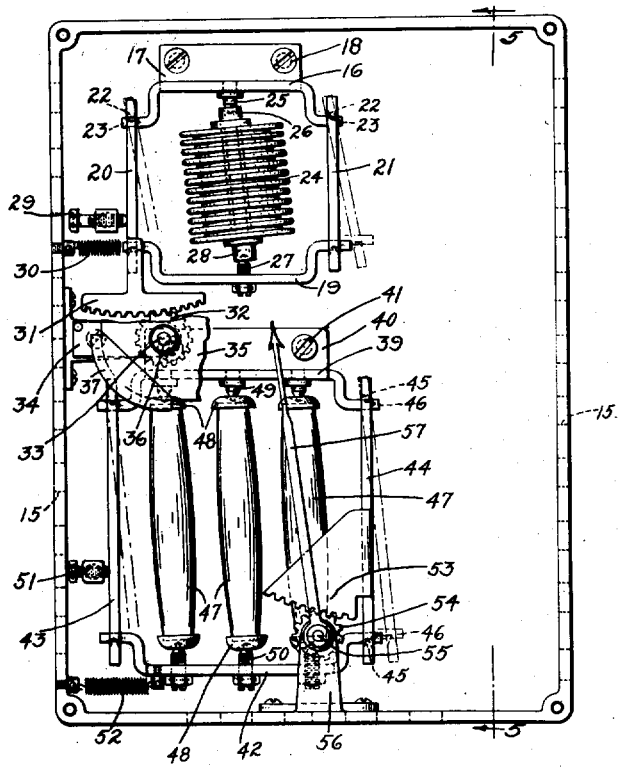
Fig. 4 is a front elevation, with the cover plate removed, and with the indicating scale element partially broken away.
Figure 5:
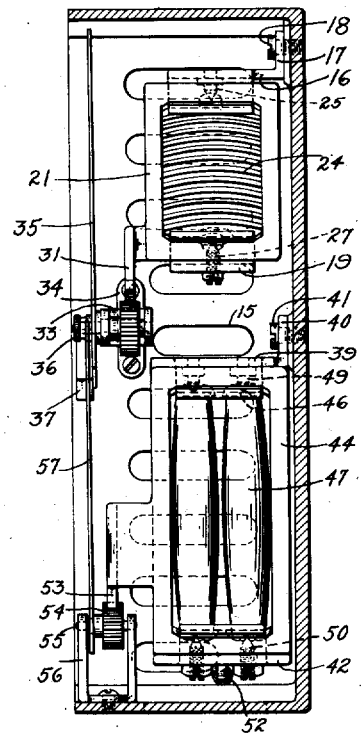
Fig. 5 is a vertical sectional view taken along the line 5—5 of Fig. 4.
Figure 6:
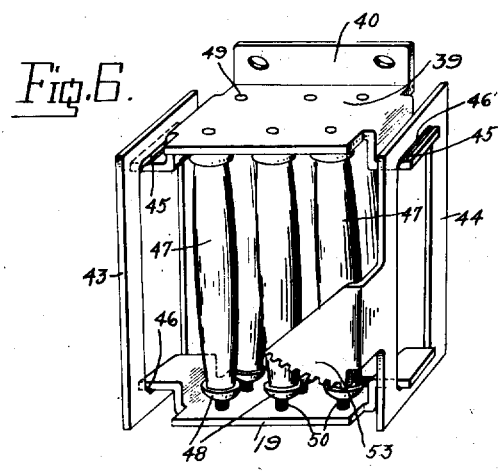
Fig. 6 is a perspective view of the humidity affected hygrostatic element employed.

Referring to the drawings, and particularly to Figs. 1 to 6, the thermohygrometer, according to the illustrated exemplary embodiment of the invention shown therein, comprises a casing 10, of generally rectangular form having a front cover plate 11 secured thereto, as by screws 12, and provided with a sight aperture 13 having a pointer 14 formed at one end in relation to the temperature scale, hereinafter more fully referred to. The sides of the casing are preferably slotted, as at 15.

Within the upper part of the casing there is arranged a temperature affected element, shown as the thermostatic bellows type, although it will be understood that any desirable type of element may be employed. This consists of a fixed upper frame part 16, having a flange portion 17 secured to the casing by means of screws 18, a movable lower frame part 19, and end frame parts 20 and 21 having fulcrum support with the ends of the parts 16 and 19, the upper and lower ends of the parts 20 and 21 being provided for this purpose with knife edges 22—22 which engage V-grooves 23—23 formed in said ends of the portions 16 and 19. The thermostatic bellows 24 is disposed within the frame parts between an upper fixed point support 25 provided in the part 16 and engaging the recessed upper end bearing portion 26 of the bellows, and an adjustable support 27 provided in the part 19 and engaging the recessed lower end bearing portion 28 of the bellows.

In the lower limit position the end frame parts 20 and 21 are substantially vertically disposed, the frame part 20 abutting an adjustable stop screw 29 toward which it is drawn by a spring 30 tied between said frame part and the side of the casing. In this position the bellows is arranged at a slight angle inclined so that its lower end is slightly to the right, and upon expansion through rising temperature swings the end frame parts 20 and 21 and the lower part 19 to the right, as indicated in dot-and-dash lines in Fig. 1.

Upon the lower end of the end frame part 20 there is provided an arcuate rack gear 31, concentric to the upper fulcrum of said frame part, and which meshes with a pinion gear 32 carried upon a shaft 33 journaled in a bracket 34 secured to the side of the casing. Upon the end of the shaft 33 the scale element 35 is secured by a nut 36, this element being in the form of a segment, counter weighted at its apex by means of a counter-weight 37. A temperature scale 38 is provided adjacent the periphery and shows through the opening 13 at the right hand end in relation to the pointer 14.

The humidity affected element which is located in the lower part of the casing is of substantially similar construction to the thermostatic element, but in place of the bellows is provided with humidity affected members adapted to expand with increase in humidity. This element comprises an upper fixed frame part 39, having an attaching flange 40 secured to the casing by screws 41, a lower movable frame part 42, end frame parts 43 and 44 having knife edge fulcrums 45 engaging V-grooves 46 in the ends of the parts 39 and 42, and humidity affected posts 47 having recessed caps 48 at their ends and mounted between fixed points 49 secured in the upper part 39 and adjustable points 50 secured in the lower part 42. The elements 47 are of well known type consisting of wooden tubes having the grain running cross-wise and adapted to expand as humidity increases. An adjustable stop screw 51 abuts the end frame part 43, the latter being drawn toward the stop by means of a spring 52 tied between the casing and the lower part 42. The posts 47 are disposed at a slight angle to the end frame parts and upon expansion swing the end and bottom frame parts to the right, as indicated in dot-and-dash lines in Fig. 1.

An arcuate gear rack portion 53 is provided on the end frame part 44 in concentric relation to its upper fulcrum and meshes with a gear 54 carried upon a shaft 55 provided in a bracket 56 secured to the lower portion of the casing, a pointer hand 57 being geared upon the end of this shaft which swings as the humidity affected element is actuated. The end of this pointer shows in the aperture 13 and moves in relation to the humidity indicator scale 58 provided on the scale element 35.

The humidity scale 58 indicates percentages of humidity for any temperature indicated by the temperature scale 38, the positions of these indications varying in accordance with the effect of moisture of the air upon the humidity element at different temperatures. At one point upon the scale 58 there is provided a distinctively colored band 59 which may be designated as a comfort zone, and which may for instance have a red section for summer and a blue section for winter. This band will indicate the proper humidity for health and comfort at any particular temperature within the normal temperature range. As shown in Fig. 1 the humidity is indicated as being at between 50% and 75% with the temperature at 77½° F. This being out of the comfort zone it indicates excessive humidity, the proper humidity for comfort being indicated by the zone as under 25%. Should the conditions then be changed to obtain the proper relative humidity and temperature the pointer 57 will move into relation with the comfort zone.

In Figs. 7 to 11 I have shown a modified form of the invention, in which the thermostatic bellows 60 is mounted at its lower end upon a bracket 61 secured to the casing 62, and is provided at its upper end with a vertically disposed gear rack 63 meshing with a pinion gear 64 provided upon the shaft 65 of a drum 66 mounted between brackets 67 and 68, the shaft ends preferably having point ends 69—69 engaging adjustable pivot screws 70—70 secured in the brackets. A flanged guide roller 71 supported upon the bracket 68 engages the rack at its rear and maintains its vertical relation in mesh with the pinion.

Temperature indicating scales 72—72 are provided at each end of the drum and show in a sight aperture 73 in the cover plate 74 of the casing, pointers 75—75 being formed at the ends of the aperture in relation to said scales.

The humidity affected element comprises a pointer hand 76, pivotally mounted upon a stud 77 carried by a bracket support 78 secured to the lower end of the casing, the pointer being counterweighted at its lower end, as at 79, and having a coiled hair spring 80 connected between it and the stud 77. The humidity affected member consists of an arc-shaped strip 81 of cellulose, having one end adjustably mounted upon the bracket 78 by an adjustable screw 82, and its other end provided with a finger extension 83 bearing upon the pointer hand, the hair spring 80 pressing the hand into contact with said finger end. As humidity increases the element 81 tends to straighten out and the hair spring moves the hand to the left as shown in Fig. 7.

The upper end of the pointer hand moves in the aperture 73 and is disposed in relation to the humidity scale 84 provided on the drum, this scale having percentages indicated in the true varied relation with the respective temperature indication, in the same manner as the scale 58 of the first embodiment. A distinctively colored comfort indicating zone 85 is also provided in the same manner as the comfort indication 59 of the first embodiment.

The operation is substantially the same as that of the first embodiment, with the exception that the scale element on the drum 66 is rotatable as temperature changes, as distinguished from the swinging scale element 35 of the first embodiment.

I have illustrated and described preferred and satisfactory embodiments of the invention but it will be obvious that changes may be made therein within the spirit and scope thereof, as defined in the appended claims.

Having thus described my invention what I claim and desire to secure by Letters Patent is:—

1. In a temperature and humidity indicating instrument, temperature actuated means, humidity actuated means, chart means arranged to be moved by one of said actuated means, and indicating means arranged to be moved by said other actuated means in relation to said chart, said chart having indicia means arranged to indicate varying temperatures and relative humidity corresponding to the varying shown temperature.

2. In a temperature and humidity indicating instrument, temperature actuated means, humidity actuated means, chart means arranged to be moved by said temperature actuated means with changes of temperature, and indicating means arranged to be moved by said humidity actuated means in relation to said chart means, said chart means having indicia means adapted as said chart means is moved to show varying temperatures, and indicia means in relation to each temperature indication adapted to show relative humidity for each temperature and in relation to which said indicating means moves with changes of humidity.

3. In a temperature and humidity indicating instrument, temperature actuated means, humidity actuated means, chart means, means cooperating between said chart means and one of said actuated means adapted to impart relative movement between said chart means and said one actuated means, indicating means disposed in relation to said chart means, and means cooperating between said indicating means and said other actuated means adapted to impart relative movement between said indicating means and said other actuated means, said chart means having indicia means arranged to indicate varying temperatures and relative humidity corresponding to varying shown temperature.

BORIS BOGOSLOWSKY.